US008049548B2

(12) United States Patent
Gil

(10) Patent No.: US 8,049,548 B2
(45) Date of Patent: Nov. 1, 2011

(54) DIGITAL SYNCHRONOUS CIRCUIT

(75) Inventor: Joong-Sug Gil, Gwangjin-gu (KR)

(73) Assignee: Dongbu HiTek Co., Ltd., Seoul (KR)

( * ) Notice: Subject to any disclaimer, the term of this patent is extended or adjusted under 35 U.S.C. 154(b) by 189 days.

(21) Appl. No.: 12/643,654

(22) Filed: Dec. 21, 2009

(65) Prior Publication Data

US 2010/0164587 A1    Jul. 1, 2010

(30) Foreign Application Priority Data

Dec. 30, 2008   (KR) .................. 10-2008-0137603

(51) Int. Cl.
*G06F 1/04*   (2006.01)
(52) U.S. Cl. ........................ 327/295; 327/291
(58) Field of Classification Search .................. 327/295
See application file for complete search history.

(56) References Cited

U.S. PATENT DOCUMENTS

| | | | | |
|---|---|---|---|---|
| 5,396,129 A * | 3/1995 | Tabira | .............................. | 326/93 |
| 5,777,500 A * | 7/1998 | Eitrheim | ........................ | 327/174 |
| 6,020,774 A * | 2/2000 | Chiu et al. | ...................... | 327/295 |
| 6,028,816 A * | 2/2000 | Takemae et al. | ........... | 365/233.1 |
| 6,151,274 A * | 11/2000 | Takemae et al. | ........... | 365/233.1 |
| 6,794,912 B2 * | 9/2004 | Hirata et al. | ................... | 327/158 |
| 7,224,235 B2 * | 5/2007 | De Ranter et al. | ............... | 331/34 |
| 7,456,673 B2 * | 11/2008 | Bae et al. | ....................... | 327/291 |
| 2004/0232967 A1 * | 11/2004 | Ishimi | ............................ | 327/291 |
| 2004/0257139 A1 * | 12/2004 | Shelor | ........................... | 327/295 |
| 2005/0040875 A1 * | 2/2005 | Lee | ............................... | 327/291 |
| 2007/0176663 A1 * | 8/2007 | Bisanti et al. | .................. | 327/295 |

\* cited by examiner

*Primary Examiner* — Lincoln Donovan
*Assistant Examiner* — Ryan Jager
(74) *Attorney, Agent, or Firm* — Sherr & Vaughn, PLLC

(57) ABSTRACT

A digital synchronous circuit includes a clock generator for generating a reference clock signal, a plurality of delays for delaying the reference clock signal by predetermined different times, a transition varying buffer for controlling input transitions of the clock signals received from the plurality of the delays, a transition controller for controlling operation of the transition varying buffer, and a plurality of registers driven by the clock signals from the plurality of delays.

20 Claims, 1 Drawing Sheet

DIGITAL SYNCHRONOUS CIRCUIT

Figure 1:
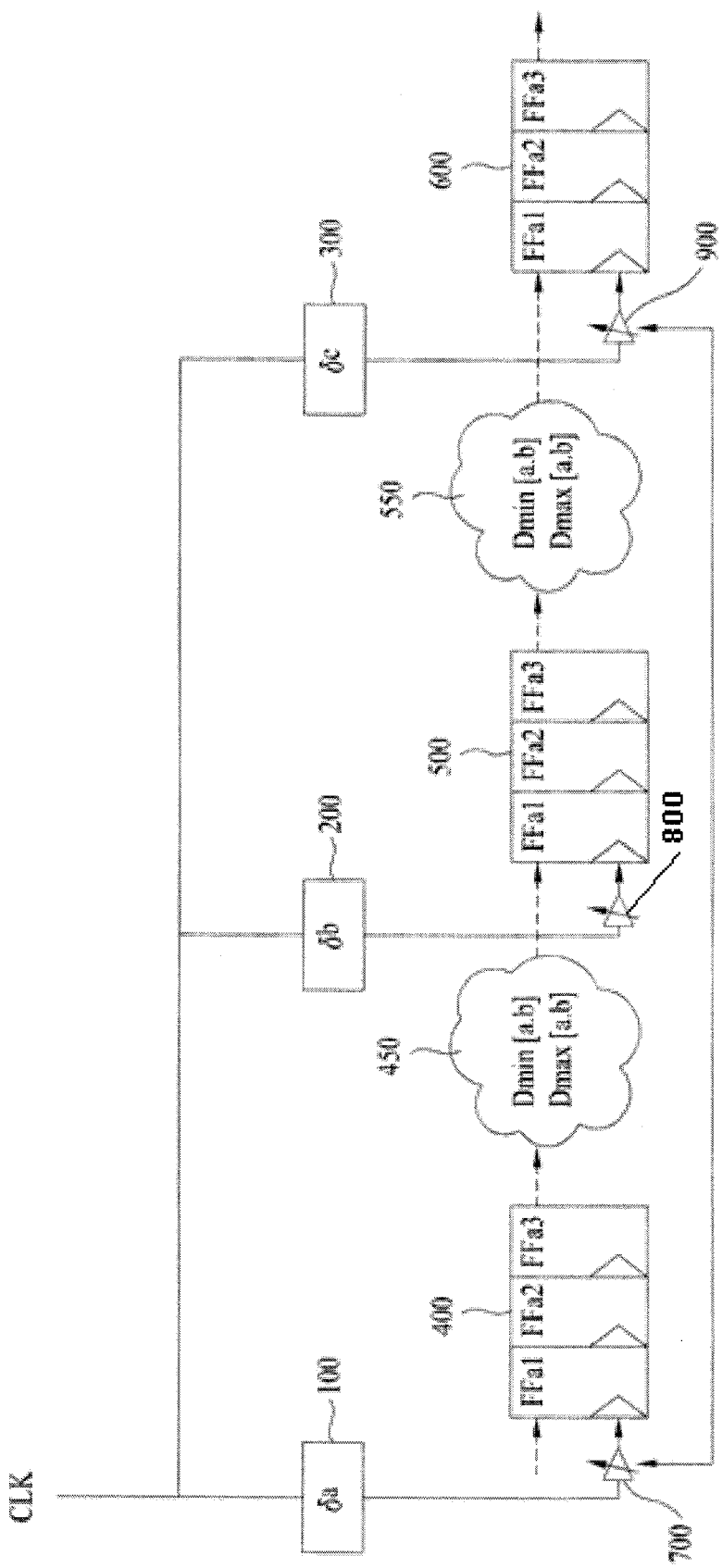

The present application claims priority under 35 U.S.C. §119 to Korean Patent Application No. 10-2008-0137603 (filed on Dec. 30, 2008), which is hereby incorporated by reference in its entirety.

BACKGROUND

In a digital device, when a clock signal is defective or unstable, a system may malfunction. A bad connection of a portable terminal and distortion of data transmitted from a facsimile are mostly attributed to instability of a clock signal. The clock signal may be used as an operation source of a digital circuit serves as the core of the circuit. Therefore, frequency accuracy and stability are requirements of the clock signal. Their importance is increasing along with an increased demand for high-speed computation and fast processing. Moreover, the role of the clock signal is so significant to fields requiring reliability, such as communication equipment, that double or multiple clock signals are used for a normal operation in case one clock generation source has errors.

SUMMARY

Embodiments relate to a data reception apparatus such as a digital synchronous circuit that prevents Electro-Magnetic Interference (EMI) and IR drop.

In accordance with embodiments, a digital synchronous circuit can include art least one of the following: a clock generator for generating a reference clock signal, a plurality of delays for delaying the reference clock signal by predetermined different time, a transition variable buffer for controlling input transitions of the clock signals received from the plurality of the delays, a transition controller for controlling operation of the transition variable buffer, and a plurality of registers driven by the clock signals from the plurality of delays.

In accordance with embodiments, a digital synchronous circuit can include art least one of the following: a clock generator configured to generate a reference clock signal; a plurality of delays configured to delay the reference clock signal by a predetermined different time; a transition varying buffer configured to control input transitions of the clock signals received from the plurality of the delays; a transition controller configured to control operation of the transition varying buffer; and a plurality of registers driven by the clock signals from the plurality of delays.

In accordance with embodiments, a digital synchronous circuit can include art least one of the following: a clock generator configured to generate a reference clock signal; a first delay, a second delay and a third delay each configured to delay the reference clock signal by a predetermined different time; a transition varying buffer configured to control input transitions of the clock signals received from the first delay, the second delay and the third delay; a transition controller configured to control operation of the transition varying buffer; and a plurality of registers driven by the clock signals from the plurality of delays.

In accordance with embodiments, a digital synchronous circuit can include art least one of the following: a clock generator configured to generate a reference clock signal; a first delay, a second delay and a third delay each configured to delay the reference clock signal by a predetermined different time; a transition varying buffer configured to control input transitions of the clock signals received from the first delay, the second delay and the third delay; a transition controller configured to control operation of the transition varying buffer; and a first register connected to and driven by the clock signal from the first delay; a second register connected to and driven by the clock signal from the second delay; and a third register connected to and driven by the clock signal from the third delay.

DRAWINGS

Example FIG. 1 illustrates a digital synchronous circuit, in accordance with embodiments.

DESCRIPTION

Reference will now be made in detail to embodiments, examples of which are illustrated in the accompanying drawings. Wherever possible, the same reference numbers will be used throughout the drawings to refer to the same or like parts.

Example FIG. 1 is a block diagram of a digital synchronous circuit in accordance with embodiments.

As illustrated in example FIG. 1, a digital synchronous circuit is applied to a large circuit board along with other multiple chips. For example, the digital synchronous circuit is used in a circuit such as a microprocessor and a synchronous Random Access Memory (RAM). The digital synchronous circuit in accordance with embodiments includes three-stage circuits and registers 400, 500 and 600 that are connected to one another. While three registers 400, 500 and 600 are illustrated in accordance with embodiments, more registers may be connected as required. The registers 400, 500 and 600 are driven by clock generator CLK. While a synchronous system has a plurality of synchronous circuit ends, it uses only one clock generator CLK.

A crystal oscillator or a phase locked loop (PLL) clock generator may be used as the clock generator CLK. The crystal oscillator generates electronic pulses at every predetermined interval by accurate and regular vibrations as clock pulses or a timing signal, so as to synchronize all operations of each component in a system. The PLL clock generator includes a PLL, a first divider, and a plurality of output buffers and maintains a reference clock signal and a feedback clock signal at the same frequency and phase.

A clock signal from the clock generator CLK applies delays to the registers 400, 500 and 600. Meaning, delays 100, 200 and 300 apply time delays to the registers 400, 500 and 600, respectively. Each register 400, 500 and 600 may include one or more flip-flops. The time delays that delays 100, 200 and 300 apply to registers 400, 500 and 600 are (δa, δb, and δc, respectively.

The following equation describes a reference clock signal in the digital synchronous circuit illustrated in example FIG. 1.

$$\delta i - \delta j < T - D_{max[i,j]}$$

$$\delta i - \delta j > -D_{min[i,j]}$$

$$\delta_i \delta_j > T - D_{max[i,j]}$$

$$\delta_i \delta_j > T - D_{min[i,j]}$$

where i and j are paths of output register i and input register j, δi and δj are input delays, T is a clock cycle time, $D_{max[i,j]}$ is a longest delay from output register i to input register j, and $D_{min\ [i,j]}$ is a shortest delay from output register i to input register j.

Registers 400, 500 and 600 are circuits that synchronize and control a plurality of clock signals by eliminating time phase differences, i.e., skews between the clock signals. Although a clock signal is generated from the single clock generator CLK, it is branched into a plurality of clock signals as it passes through delays 100, 200 and 300. In the course of being applied to respective circuit ends, some of the clock signals differ in phase due to phase delay, signal loss, etc. As a consequence, the overall synchronization of the system is not normal. For instance, in case of voice data, the voice is distorted. If control data are exchanged, a deadly error occurs to the system. That's why a circuit for eliminating the skew, i.e., phase difference between clock signals is introduced to prevent the foregoing phenomenon.

Transition varying buffer 800 controls an overall relationship between registers 400, 500 and 600 by controlling the phase and delay of each clock signal while interworking with register 500. Meaning, each register 400, 500 and 600 determines the slope of an edge at which the clock signal changes from low to high. The time delay of the clock signal depends on the slope. Transition varying buffer 800 can be controlled by connecting transition controller 900 to register 500.

As is apparent from the above description, in accordance with embodiments, since the transition varying buffer and the transition controller are added to control the clock input transition of flip-flops, EMI and IR drop of the digital synchronous circuit caused by a change in the clock input transition of the flip-flops can be further mitigated as far as the operation of the digital synchronous circuit allows.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprising:
   a clock generator configured to generate a reference clock signal;
   a plurality of delays configured to delay the reference clock signal by a predetermined different time;
   a transition varying buffer configured to control input transitions of the clock signals received from the plurality of the delays;
   a transition controller configured to control operation of the transition varying buffer; and
   a plurality of registers driven by the clock signals from the plurality of delays.

2. The apparatus of claim 1, wherein the clock generator comprises a crystal oscillator.

3. The apparatus of claim 1, wherein the crystal oscillator is configured to generate electronic pulses at every predetermined interval by accurate and regular vibrations as one of clock pulses or a timing signal.

4. The apparatus of claim 1, wherein the clock generator comprises a phase locked loop.

5. The apparatus of claim 4, wherein the phase locked loop comprises a first divider and a plurality of output buffers.

6. The apparatus of claim 5, wherein the phase locked loop is configured to maintain a reference clock signal and a feedback clock signal at the same frequency and phase.

7. The apparatus of claim 1, wherein the registers are configured to control slopes of edges at which the clock signals change from low to high.

8. The apparatus of claim 1, wherein each of the registers includes a plurality of flip-flops.

9. The apparatus of claim 1, wherein each of the registers includes a flip-flop.

10. The apparatus of claim 1, wherein the apparatus comprises a digital synchronous circuit.

11. The apparatus of claim 1, wherein the plurality of registers comprises a first register, a second register and a third register.

12. The apparatus of claim 11, wherein the first register, the second register and the third register are connected to each other.

13. The apparatus of claim 11, wherein the plurality of delays comprises a first delay, a second delay and a third delay.

14. The apparatus of claim 12, wherein the plurality of delays comprises a first delay, a second delay and a third delay.

15. The apparatus of claim 12, wherein the plurality of delays comprises a first delay, a second delay and a third delay.

16. The apparatus of claim 14, wherein the first delay is connected to the first register, the second delay is connected to the second register and the third delay is connected to the third register.

17. An apparatus comprising:
   a clock generator configured to generate a reference clock signal;
   a first delay, a second delay and a third delay each configured to delay the reference clock signal by a predetermined different time;
   a transition varying buffer configured to control input transitions of the clock signals received from the first delay, the second delay and the third delay;
   a transition controller configured to control operation of the transition varying buffer; and
   a plurality of registers driven by the clock signals from the plurality of delays.

18. The apparatus of claim 17, wherein the apparatus comprises a digital synchronous circuit.

19. An apparatus comprising:
   a clock generator configured to generate a reference clock signal;
   a first delay, a second delay and a third delay each configured to delay the reference clock signal by a predetermined different time;
   a transition varying buffer configured to control input transitions of the clock signals received from the first delay, the second delay and the third delay;
   a transition controller configured to control operation of the transition varying buffer; and
   a first register connected to and driven by the clock signal from the first delay;
   a second register connected to and driven by the clock signal from the second delay; and
   a third register connected to and driven by the clock signal from the third delay.

20. The apparatus of claim 19, wherein the apparatus comprises a digital synchronous circuit.

* * * * *